US010580431B2

(12) United States Patent
Gordon et al.

(10) Patent No.: US 10,580,431 B2
(45) Date of Patent: *Mar. 3, 2020

(54) AUDITORY INTERPRETATION DEVICE WITH DISPLAY

(71) Applicant: Auditory Labs LLC, Westlake, OH (US)

(72) Inventors: Brian T. Gordon, Westlake, OH (US); Nadia M. Gordon, Westlake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/375,318

(22) Filed: Apr. 4, 2019

(65) Prior Publication Data
US 2019/0228792 A1 Jul. 25, 2019

Related U.S. Application Data

(63) Continuation-in-part of application No. 14/837,764, filed on Aug. 27, 2014, now Pat. No. 10,299,050.

(51) Int. Cl.
G10L 21/10 (2013.01)
G10L 15/26 (2006.01)
G10L 15/22 (2006.01)
G09B 21/00 (2006.01)
G10L 21/06 (2013.01)
H04N 21/488 (2011.01)
H04R 25/00 (2006.01)

(52) U.S. Cl.
CPC ............ *G10L 21/10* (2013.01); *G09B 21/009* (2013.01); *G10L 15/22* (2013.01); *G10L 15/26* (2013.01); *G10L 15/265* (2013.01); *G10L 2021/065* (2013.01); *H04N 21/4884* (2013.01); *H04R 25/305* (2013.01); *H04R 25/556* (2013.01); *H04R 25/606* (2013.01); *H04R 2225/021* (2013.01); *H04R 2225/61* (2013.01); *H04R 2225/67* (2013.01)

(58) Field of Classification Search
CPC ... H04R 25/556; H04R 2420/09; G10L 21/10; G10L 15/265; G10L 15/22; G10L 15/26; G10L 2021/065; G09B 21/009; H04N 21/4884
USPC ....................................................... 381/312
See application file for complete search history.

(56) References Cited

U.S. PATENT DOCUMENTS

| 7,151,488 B2* | 12/2006 | Wakamori | G01S 19/35 342/357.75 |
|---|---|---|---|
| 2004/0215449 A1* | 10/2004 | Roy | G10L 15/08 704/211 |
| 2008/0031475 A1* | 2/2008 | Goldstein | H04M 1/05 381/151 |
| 2013/0148828 A1* | 6/2013 | Fort | H04R 25/30 381/312 |
| 2014/0074466 A1* | 3/2014 | Sharifi | G10L 15/08 704/235 |
| 2015/0382047 A1* | 12/2015 | Van Os | G06F 16/73 725/38 |
| 2017/0230709 A1* | 8/2017 | Van Os | G06F 16/73 |

* cited by examiner

Primary Examiner — Sean H Nguyen
(74) Attorney, Agent, or Firm — McCarthy, Lebit, Crystal & Liffman

(57) ABSTRACT

An assistive listening system that comprises an auditory interpretation device with a digital receiver that is tuned to receive a particular digital signal from a digital audio transmitter with microphone and a digital display screen to view human voice audio interpreted as text.

6 Claims, 8 Drawing Sheets

AUDITORY INTERPRETATION DEVICE WITH DISPLAY

RELATED APPLICATIONS

This application is a continuation-in-part of U.S. patent application Ser. No. 14/837,764, which claims the benefit of provisional patent application Ser. No. 62/042,331 and its filing date Aug. 27, 2014. All priority applications are incorporated herein by reference as though fully rewritten herein.

FIELD OF INVENTION

The present invention is in the field of assistive listening systems and devices for the deaf and hard of hearing or other persons with special needs.

SUMMARY OF INVENTION

A multi-user assistive listening system that comprises an auditory interpretation device containing a digital receiver and a digital display screen. Methods employing the auditory interpretation device to capture and interpret continuous human voice audio to display as text at locations remote from the speaker are also disclosed and claimed.

DETAILS OF INVENTION

The invention is a multi-user assistive listening system that captures and interprets continuous human voice audio from one or more secondary users transmitted by a digital audio transmitter with microphone, often referred to as a personal FM or DM system, further comprising voice recognition software means for interpreting human voice audio to display as text to a primary user, and methods employing the same.

DESCRIPTION OF PREFERRED EMBODIMENTS

Figure 1:
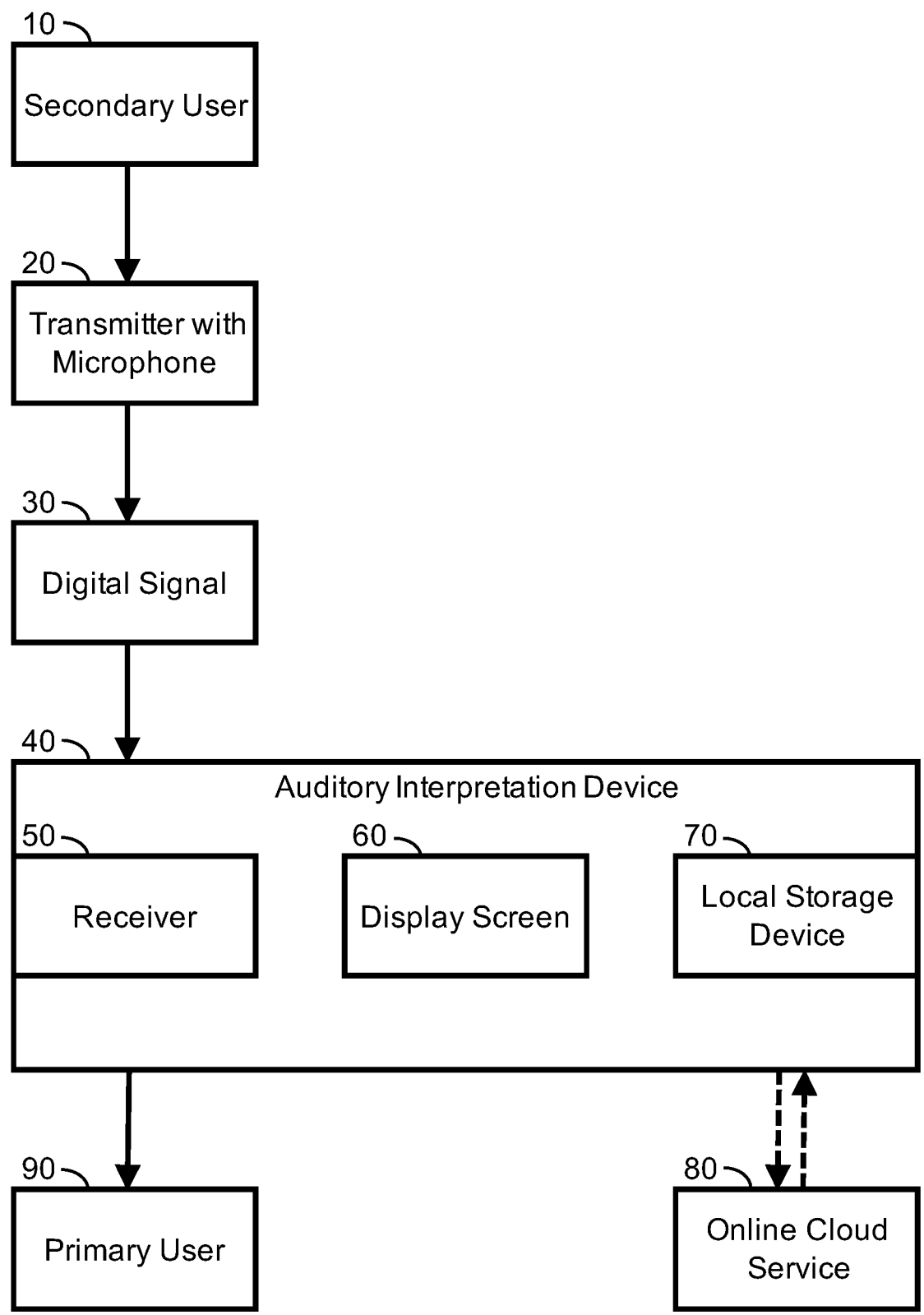
FIG. 1 is a flow diagram of the assistive listening system.
Figure 2:
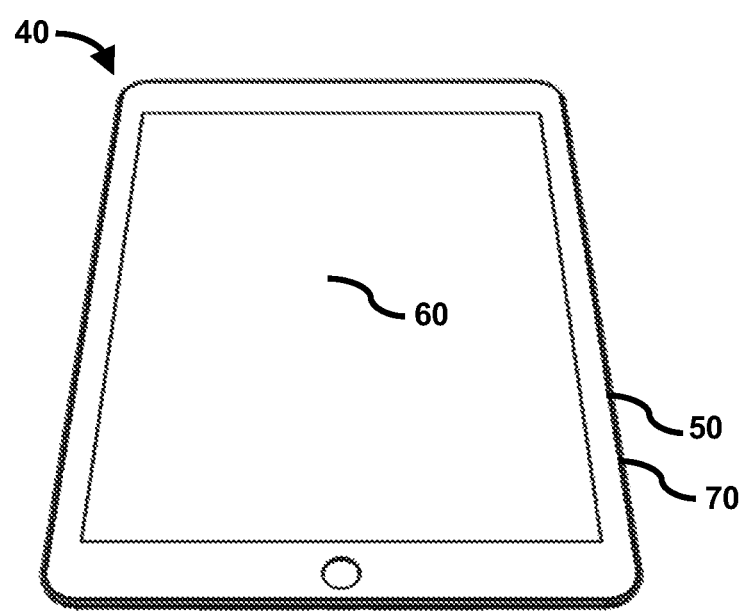
FIG. 2 depicts one embodiment of the auditory interpretation device.
Figure 3:
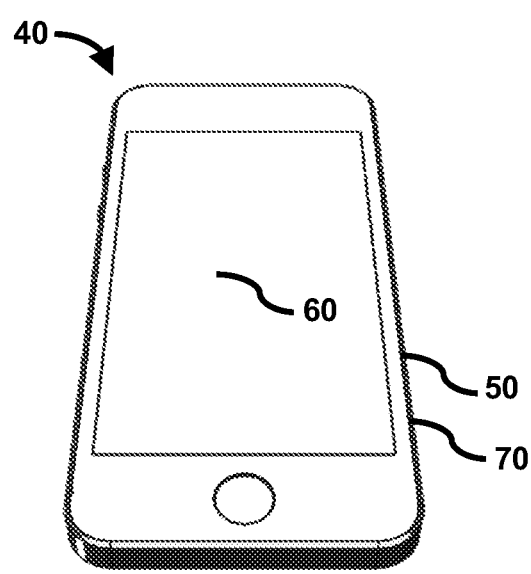
FIG. 3 depicts another embodiment of the auditory interpretation device.
Figure 4:
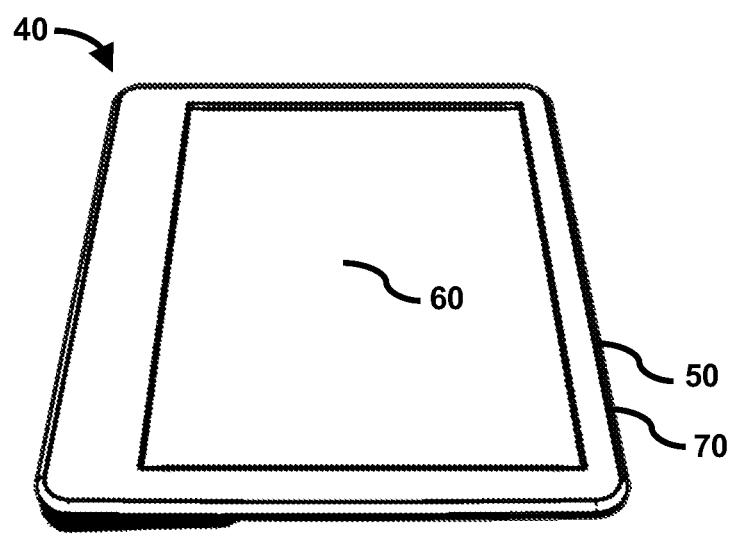
FIG. 4 depicts another embodiment of the auditory interpretation device.
Figure 5:
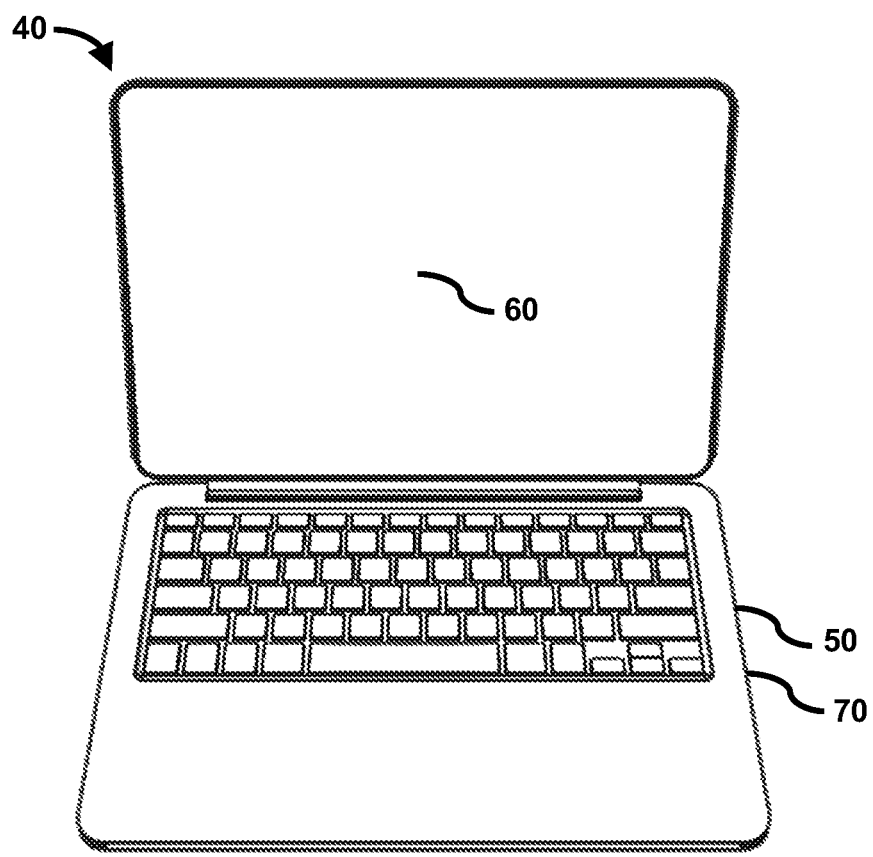
FIG. 5 depicts another embodiment of the auditory interpretation device

Referring initially to the drawings, FIG. 1 is a flow diagram of the instant invention, that includes the auditory interpretation device 40. The auditory interpretation device 40 of the instant invention is used normally with human voice audio emanating from secondary user 10, which may be live or recorded. The human voice audio is interpreted as text and viewed on a digital display screen 60 for the benefit of the primary user 90.

Human voice audio emanating from the secondary user 10 is transmitted via a digital audio transmitter with microphone 20 which is then received by the auditory interpretation device 40 that comprises a digital receiver 50 and a digital display screen 60. The carrier frequency transmitted by the digital audio transmitter with microphone 20 to be received by the digital receiver 50 may include but is not limited to 2.4 GHz. The communication platform may be of a proprietary nature. A proprietary communication platform may include but is not limited to the Phonak SWORD and Phonak Roger communication platforms. The digital receiver 50 may also include automatic channel tuning or may include frequency-hopping technology.

The digital audio transmitter with microphone 20 may be any one of a number of commercially available microphones, such as are used in the classroom for deaf and hard of hearing students. Commercially available microphones include but are not limited to the Phonak Roger Inspire Mic, Phonak Roger Touchscreen Mic, Phonak Roger Clip-on Mic, Phonak Roger Pen, Phonak Roger Easy Pen, Phonak Roger Table Mic, Phonak Roger Select, the GN Resound family of microphone products, the Cochlear family of microphone products, the Oticon family of microphone products and others.

Figure 6:
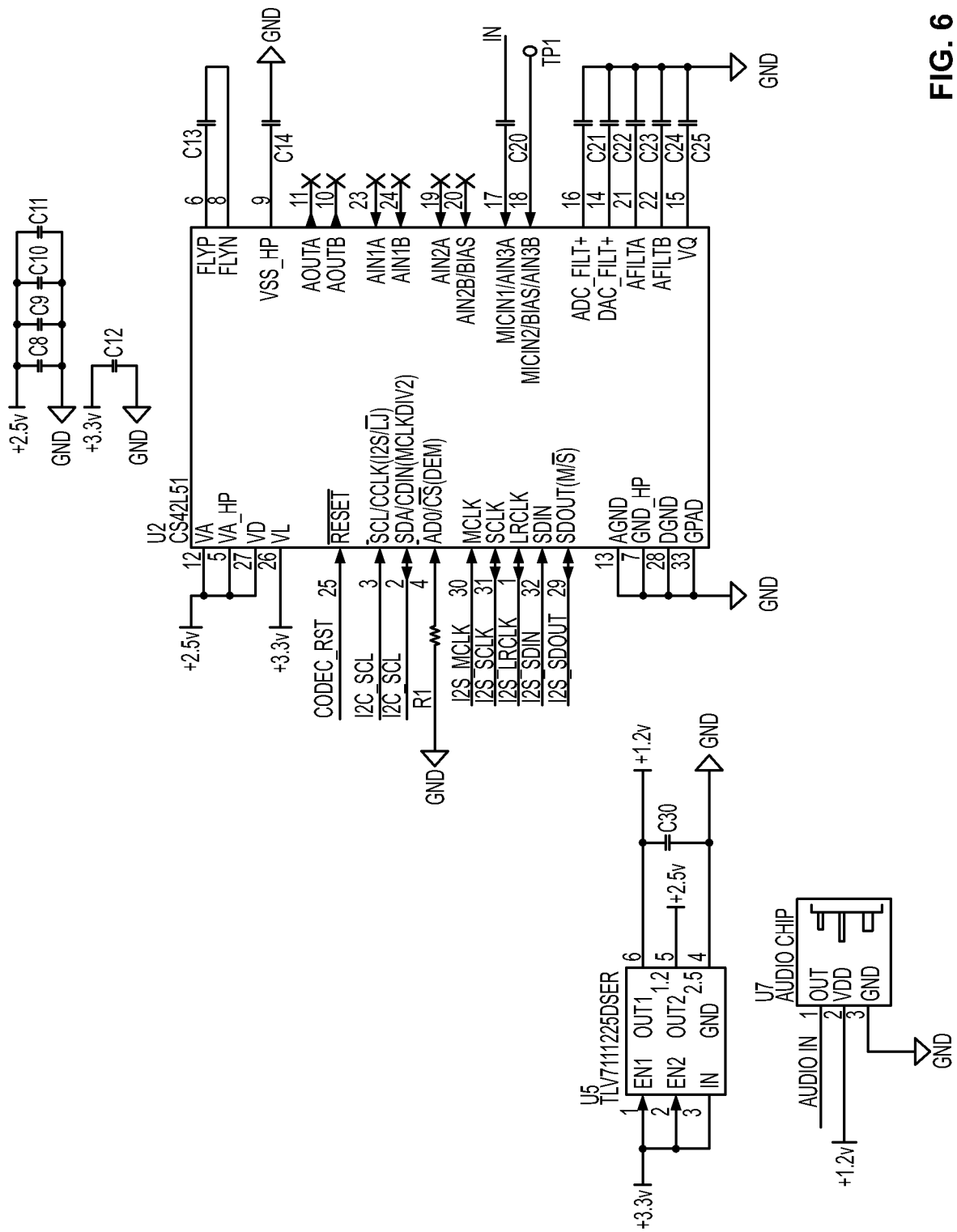
FIG. 6 is an electrical schematic of the digital receiver.
Figure 6:
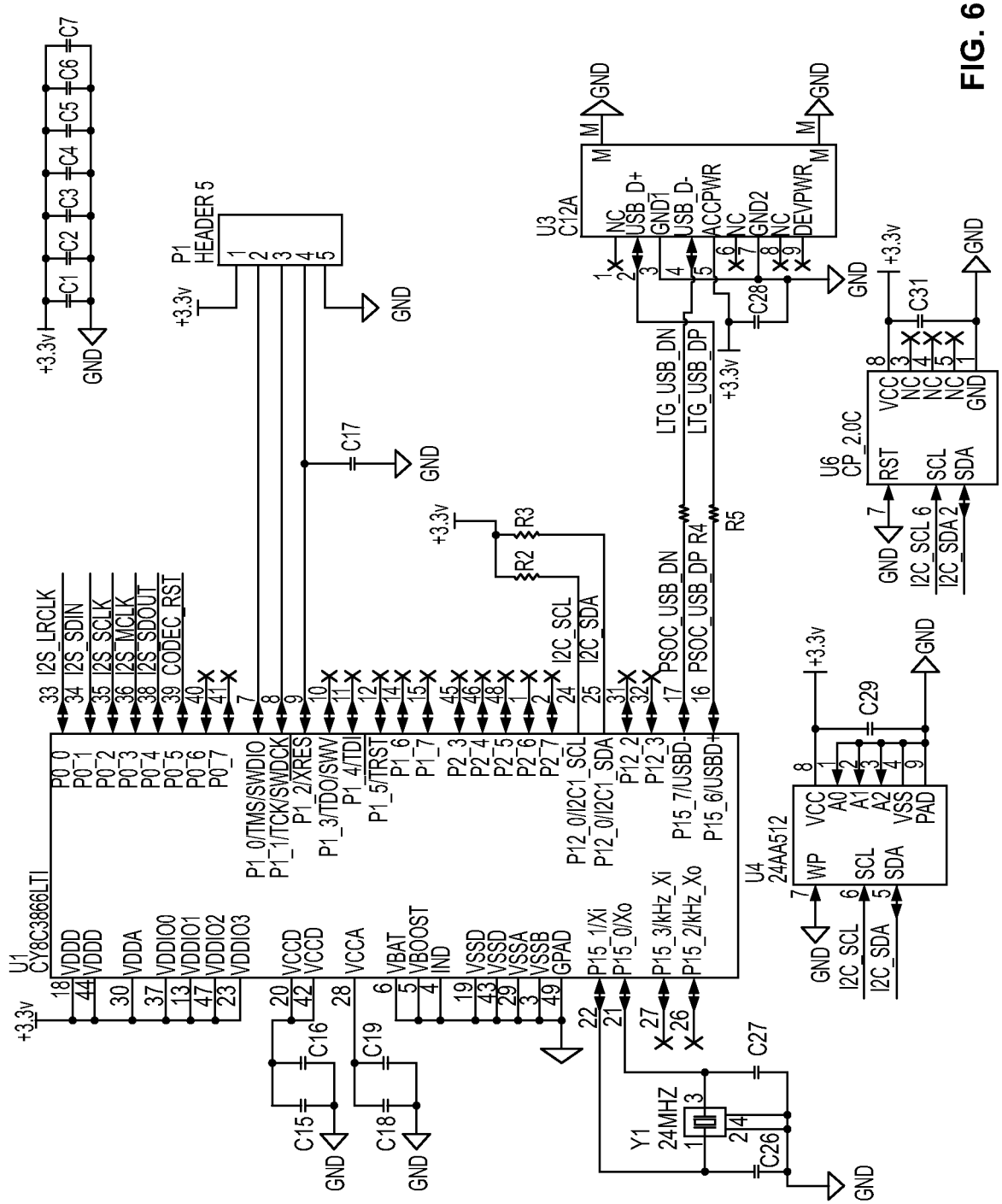

The auditory interpretation device 40 comprises electronic hardware including a digital receiver 50 for the purpose of receiving the digital signal 30 emanating from the digital audio transmitter with microphone 20, and a digital display screen 60 for viewing the human voice audio interpreted as text. As one skilled in the art would appreciate with reference to the electrical schematic in FIG. 6, the auditory interpretation device 40 comprises a digital receiver 50 set to or adjustably set to the radio frequency of digital audio transmitter with microphone 20.

There is software resident in the auditory interpretation device 40 that controls the recordation of the audio received therein and that stores such audio as a digital signal 30 on either a local storage device 70 or with an online cloud service 80 for later playback and perhaps further manipulation. The software residing in the auditory interpretation device 40 also has the ability to send the recorded audio to an offsite location via the Internet to be transcribed using any one of a number of commercially available machine or human generated transcription services. Optionally, the software residing in the auditory interpretation device 40 also has the ability to create, control and receive transcriptions of human voice audio from any one of a number of commercially available machine or human generated transcription services. Commercially available transcription services include but are not limited to Nuance, VoiceBase, Apple Siri, Google Assistant, Google Transcribe, Amazon Alexa, Amazon Transcribe, Microsoft Cortana, Microsoft Translator, IBM Watson and others.

The auditory interpretation device 40 may take the embodiment of any one of a number of well-known mobile computing device types with digital display screens. These device types include but are not limited to tablet computers, mobile smartphones, e-readers and laptop computers.

The auditory interpretation device 40 is composed of well-known electronic components. These electronic components include but are not limited to integrated circuits, capacitors, resistors, transistors, diodes, electronic circuitry, buttons, switches, circuit boards, communication and signal processors, batteries as well as a digital receiver 50 and a digital display screen 60.

The software residing in the auditory interpretation device 40 may include a mobile application also referred to as an app, in which the graphical user interface would include but not be limited to "soft" buttons for powering and control of the auditory interpretation device 40. Features of the software portion of the invention are not limited to those mentioned above.

The operating system residing in the auditory interpretation device 40 can include but is not limited to Apple iOS, Apple macOS, Google Android, Google Chrome, Amazon Fire OS, Microsoft Windows and others.

FIGS. 2, 3, 4 and 5 depict four possible embodiments of the auditory interpretation device 40 which all include a digital display screen 60.

Figure 7:
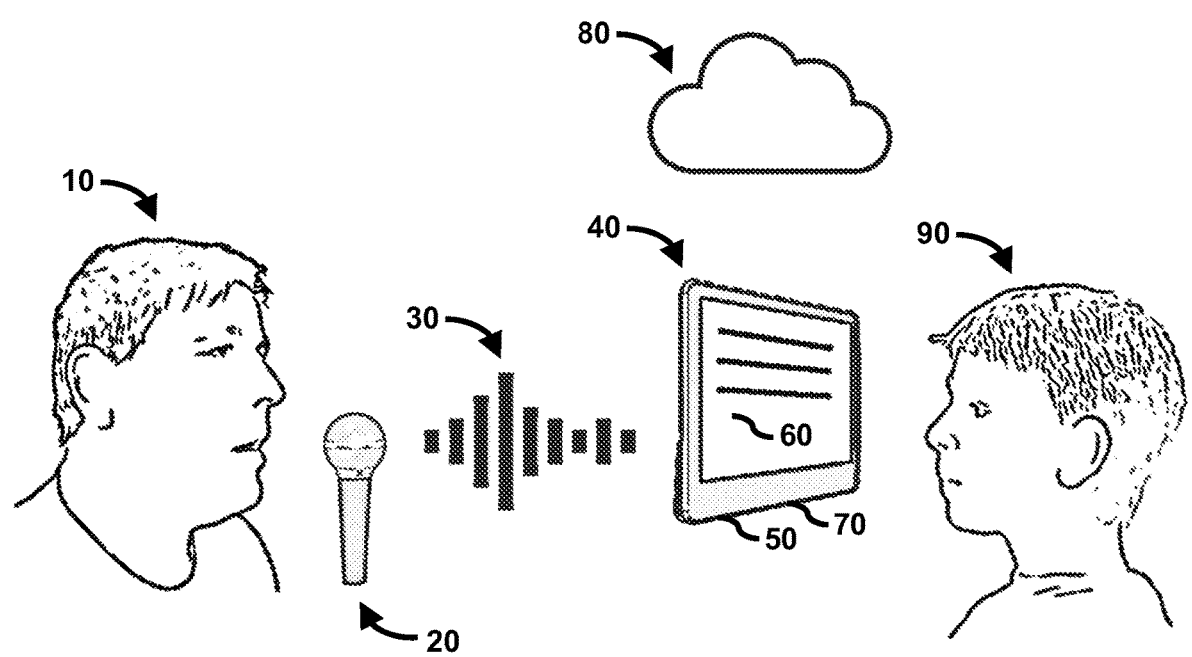
FIG. 7 depicts a basic use case for the assistive listening system.

FIG. 7 depicts a basic use case wherein the secondary user 10 speaks continuous human voice audio into a digital audio transmitter with microphone 20. The digital audio transmitter with microphone 20 then sends a digital signal 30 to the digital receiver 50 residing in the auditory interpretation device 40, where the digital signal 30 is then interpreted and displayed as text to the primary user 90 on the digital display screen 60. The auditory interpretation device 40 has the ability to store data on either a local storage device 70 or with an online cloud service 80.

A first use case is a student of any age that may be deaf or hard of hearing or having some other special need using the invention in a classroom setting. The teacher, referred to as the secondary user, uses a personal FM or DM microphone transmitter while the student, referred to as the primary user, uses the invention to capture and interpret human voice audio as text viewed on the digital display screen of the auditory interpretation device.

A second use case is an individual of any age that may be deaf or hard of hearing or having some other special need using the invention in settings such as theaters, places of worship, museums, public meeting places, corporate conference rooms, convention centers, and other large gathering areas. The speaker, referred to as the secondary user, uses a personal FM or DM microphone transmitter while the individual, referred to as the primary user, uses the invention to capture and interpret human voice audio as text viewed on the digital display screen of the auditory interpretation device.

The foregoing descriptions of specific embodiments of the present invention are presented for purposes of illustration and description. They are not intended to be exhaustive nor are they intended to limit the invention to precise forms disclosed. Obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the drawings and specification appended hereto and to their equivalents. It is intended that the scope of the invention be defined by the following claims.

The invention claimed is:

1. A multi-user assistive listening system to enhance a primary user's ability to capture and interpret continuous spoken word from one or more secondary users by means of voice recognition software comprising, in combination:
   a digital audio transmitter comprising a stand-alone microphone wherein said stand-alone microphone is separate from a stand-alone auditory interpretation device for transmitting a digital signal of a human voice from said secondary user;
   said stand-alone auditory interpretation device, comprising in combination:
      a digital receiver set at a selected frequency for receiving said digital signal from said stand-alone microphone;
      a digital display screen for viewing human voice audio interpreted as text;
   wherein said auditory interpretation device has a storage means for storing the retransmitted digital signal as a stored digital file.

2. The assistive listening system as claimed in claim 1, further comprising voice recognition software means for converting said stored digital file to a transcription of the digital signal of the human voice for display to said primary user.

3. The assistive listening system as claimed in claim 2 wherein the storage means is capable of storing the transcription of the digital signal for later display to said primary user.

4. The assistive listening system as claimed in claim 3 wherein the voice recognition software means to transcribe the stored digital file is remote from the storage means.

5. The assistive listening system as claimed in claim 4 wherein the auditory interpretation device is capable of delivering the transcription of the digital signal to said primary user from the storage means.

6. A multi-user assistive listening system to enhance a primary user's ability to capture and interpret continuous spoken word from one or more secondary users by means of voice recognition software comprising, in combination:
   a digital audio transmitter comprising a stand-alone microphone wherein said stand-alone microphone is separate from a stand-alone auditory interpretation device for transmitting a digital signal of a human voice from said secondary user;
   said stand-alone auditory interpretation device, comprising in combination:
      a digital receiver set at a selected frequency for receiving said digital signal from said stand-alone microphone;
      a digital display screen for viewing human voice audio interpreted as text;
   wherein said auditory interpretation device has a storage means for storing the retransmitted digital signal as a stored digital file; and
   a voice recognition software means for converting said stored digital file to a transcription of the digital signal of the human voice for display to said primary user;
   wherein the storage means is capable of storing the transcription of the digital signal for later display to said primary user;
   wherein the voice recognition software means to transcribe the stored digital file is remote from the storage means; and
   wherein the auditory interpretation device is capable of delivering the transcription of the digital signal to said primary user from the storage means.

* * * * *